(12) United States Patent
Burns et al.

(10) Patent No.: US 6,694,053 B1
(45) Date of Patent: Feb. 17, 2004

(54) METHOD AND APPARATUS FOR PERFORMING DOCUMENT STRUCTURE ANALYSIS

(75) Inventors: Roland John Burns, Santa Cruz, CA (US); Thomas Kieninger, Kaiserslautern (DE); Stefan Klink, Gutweiler (DE)

(73) Assignee: Hewlett-Packard Development, L.P., Houston, TX (US)

( * ) Notice: Subject to any disclaimer, the term of this patent is extended or adjusted under 35 U.S.C. 154(b) by 627 days.

(21) Appl. No.: 09/649,397

(22) Filed: Aug. 28, 2000

Related U.S. Application Data

(60) Provisional application No. 60/168,500, filed on Dec. 2, 1999.

(51) Int. Cl.$^7$ .............................. G06K 9/00; G06T 7/00

(52) U.S. Cl. ...................... 382/176; 382/180; 382/181; 715/517; 715/520

(58) Field of Search ................................ 382/180, 181, 382/173, 176; 715/517, 520

(56) References Cited

U.S. PATENT DOCUMENTS

| | | | | |
|---|---|---|---|---|
| 5,159,667 A | * | 10/1992 | Borrey et al. | 715/500 |
| 5,669,007 A | * | 9/1997 | Tateishi | 715/517 |
| 5,848,184 A | * | 12/1998 | Taylor et al. | 382/180 |
| 5,892,843 A | * | 4/1999 | Zhou et al. | 382/176 |
| 6,542,635 B1 | * | 4/2003 | Hu et al. | 382/173 |

OTHER PUBLICATIONS

Fujihara et al. "Fuzzy Approach to Document Recognition." 2$^{nd}$ IEEE Int. Conf. on Fuzzy Systems, vol.2, Mar. 28, 1993, pp. 980–985.*

Haralick. "Document Image Understanding: Geometric and Logical Layout." Proc. CVPR '94, IEEE Computer Society Conf. on Computer Vision and Pattern Recognition, Jun. 21, 1994, pp. 385–390.*

Niyogi et al. "Knowledge–Based Derivation of Document Logical Structure." Proc. of the 3$^{rd}$ Int. Conf. on Document Analysis and Recognition, vol.1, Aug. 14, 1995, pp. 472–475.*

(List continued on next page.)

Primary Examiner—Jon Chang

(57) ABSTRACT

The present invention is directed to a method and an apparatus for performing document analysis. The apparatus of the present invention comprises logic configured to recognize and label structures in a document that are both common to multiple types of documents and that are unique to the particular type of document being analyzed. The logic preferably is a computer that receives the output of an optical character recognition (OCR) system and then analyzes the output in accordance with a document structure analysis routine. For structures that are common to multiple types of documents, various types of tests may be performed by the document structure analysis routine to recognize and label the common types of structures. In order to recognize structures that are unique to the particular type of document being analyzed, the document structure analysis routine utilizes a rule base that is adapted to the particular application domain associated with the document. The rule base comprises a plurality of rules for testing structures in the document in order to recognize unique, or application-domain-dependent, structures. These structures are also labeled. All of the labeled structures are assigned a likelihood indicator that is associated with a particular label. The likelihood indicator indicates the likelihood that the label associated with it is correct. The labels and the associated likelihood indicators may then be used to correctly identify the application-domain-dependent structures in the document.

11 Claims, 4 Drawing Sheets

OTHER PUBLICATIONS

Sauvola et al. "Page Segmentation and Classification using Fast Feature Extraction and Connectivity Analysis." Proc. of the $3^{rd}$ Int. Conf. on Document Analysis and Recognition, vol. 2, Aug. 14, 1995, pp. 1127–1131.*

Lian et al. "Document Layout Structure Extraction Using Bounding Boxes of Different Entities." Proc. $3^{rd}$ IEEE Workshop on Applications of Computer Vision, Dec. 02, 1996, pp. 278–283.*

* cited by examiner

METHOD AND APPARATUS FOR PERFORMING DOCUMENT STRUCTURE ANALYSIS

CROSS-REFERENCE TO RELATED APPLICATIONS

This application claims priority to and the benefit of the filing date of U.S. Provisional Patent Application Serial No. 60/168,500, entitled "SYSTEM FOR DOCUMENT STRUCTURE ANALYSIS BASED ON LAYOUT AND TEXTUAL FEATURES", filed on Dec. 2, 1999, which is hereby incorporated by reference herein in its entirety.

TECHNICAL FIELD OF THE INVENTION

The present invention relates to an apparatus and method for performing document structure analysis and, more particularly, to an apparatus and method for performing document structure analysis based on the layout and textual features of the document.

BACKGROUND OF THE INVENTION

Document image processing is a crucial process in the field of office automation. Document image processing begins with the optical character recognition (OCR) phase where a computer and optical imaging system are used to optically scan a paper document to acquire optical image data, convert the optical image data into electrical image data, and process the electrical image data to determine the content of the document. Known commercial OCR systems are capable of segmenting the electrical image data into blocks, lines and words upon recognizing these features. Office automation involves automating the tasks of processing, filing and retrieving documents to increase productivity of the work environment. Therefore, document analysis and understanding are crucial activities for integrated office automation systems.

Document processing generally can be divided into two stages, namely, document analysis and document understanding. Documents can normally be viewed as comprising a geometric (i.e., layout) structure and a logical structure. Extraction of the geometric structure from a document is generally referred to as document analysis. Mapping the geometric structure into a logical structure is generally referred to as document understanding.

Despite major advances in computer technology, the degree of automation in acquiring data and understanding the acquired data continues to be very limited. Most existing document analysis systems are restricted to relatively small application domains. Even though some systems may be adaptable to new application domains, the adaptation is time consuming, and may be as time consuming as developing an entirely new system suitable for the new application domain. A need exists for a system that can be easily adapted to meet the needs of many application domains and that provides a high degree of office processing automation capability. Such a system would need to have the ability to maximize the use of document structure, in terms of both geometrical and logical structure, in analyzing documents. Also, such a system would need to have an exchangeable rule base to allow the system to be easily adapted to a new application domain.

To date, logical layout analysis has not received as much attention as geometrical layout analysis, although a few methods for page understanding have been proposed. The proposed techniques can be classified into two primary classes, namely, methods based on tree transformations and methods based on formatting knowledge. Techniques belonging to the first class attempt to modify the geometrical layout tree by moving nodes in the tree and labeling each node with an indicator of the appropriate logic class according to specific sets of rules. An example of such a method is known as the "Multi-Articled Understanding" approach. A different approach that also falls within this class utilizes preliminary knowledge of the page layout in order to optimize, based on document features, the logic rules that are to be applied. In contrast to these tree-transformation approaches, formatting-knowledge methods are based on, for example, the application of syntactic grammar analysis, the characterization of the most relevant blocks in a page, the application of the macrotypo-graphical analysis, etc. These approaches to logical layout analysis have proven to be only marginally successful, at best.

Accordingly, a need exists for a method and an apparatus for performing document structure analysis that overcome the disadvantages of prior document structure analysis techniques.

SUMMARY OF THE INVENTION

The present invention is directed to a method and an apparatus for performing document analysis. The apparatus of the present invention comprises logic configured to recognize and label structures in a document that are both common to multiple types of documents and that are unique to the particular type of document being analyzed. The logic preferably is a computer that receives the output of an optical character recognition (OCR) system and then analyzes the output in accordance with a document structure analysis routine. For structures that are common to multiple types of documents, various types of tests may be performed by the document structure analysis routine to recognize and label the common types of structures. In order to recongize structures that are unique to the document, the document structure analysis routine utilizes a rule base that is adapted to the particular application domain to analyze structures in the document. The rule base comprises a plurality of rules for testing structures in the document in order to recognize unique, or application-domain-dependent, structures.

In accordance with the preferred embodiment of the present invention, each rule of the rule base includes a file attribute portion, a rule unit portion and a rule logic portion. The rule unit portion associated with a particular rule defines self-related attributes and cross-related attributes associated with the particular rule. The self-related attributes correspond to particular features of stuctures of a document being analyzed. The cross-related attributes correspond to relationships between particular features of structures of the document being analyzed. The rule logic associated with a particular rule comprises a particular logical expression associated with the particular rule. Preferably, each rule is defined by only one rule logic and by at least one rule unit, and each rule unit is associated with no more than one rule logic.

Each document to be analyzed is comprised of at least one physical block. Each physical block is analyzed and is assigned a label and a likelihood indicator. The label indicates that the physical block corresponds to a particular type of physical block and the likelihood indicator indicates the probability that the label that has been assigned to the block is correct. These labels and their associated likelihood indicators may then be used to identify the application-domain-dependent structures in the document.

These and other features and advantages of the present invention will become apparent from the following description, drawings and claims.

DETAILED DESCRIPTION OF THE INVENTION

Figure 1:
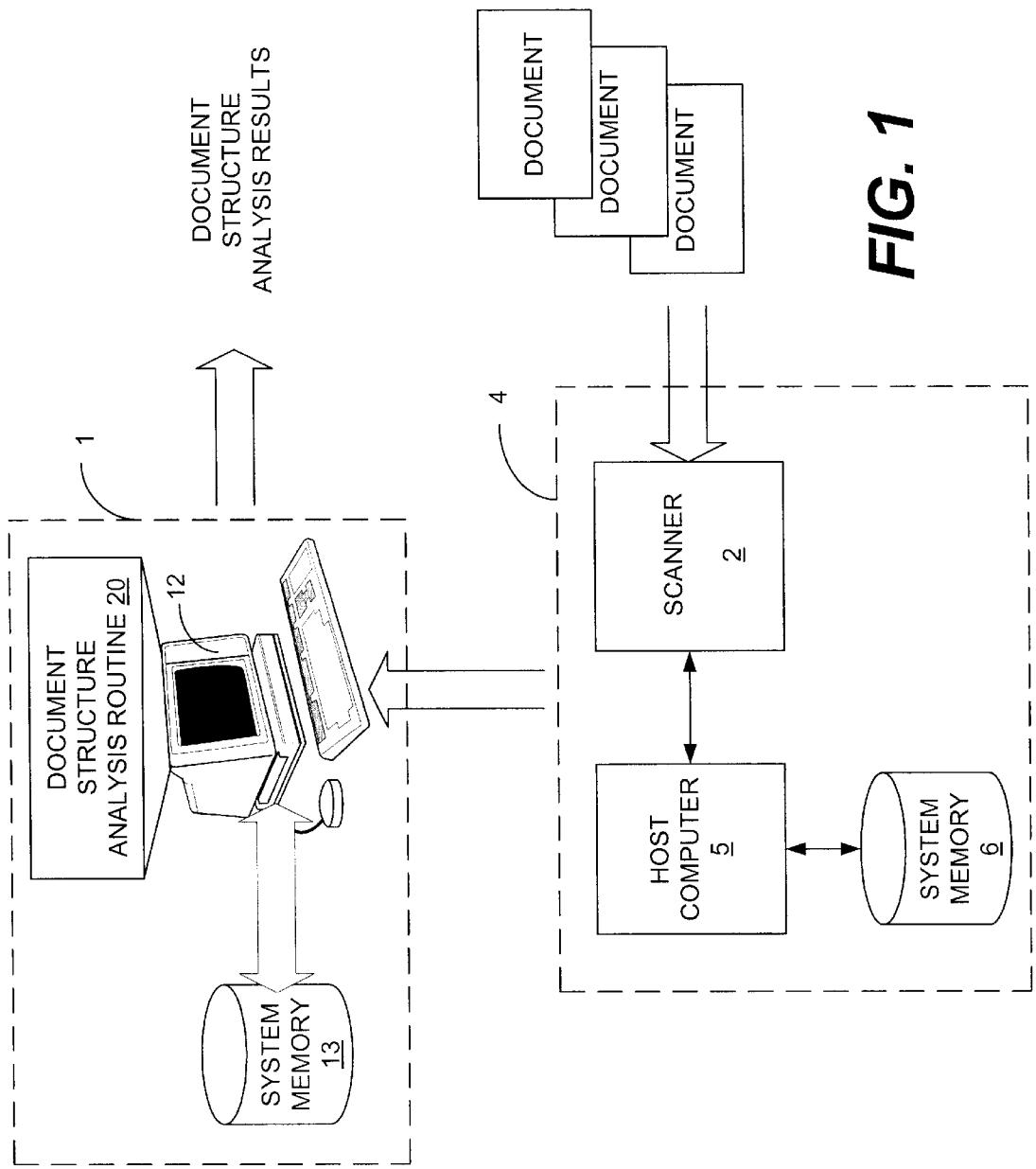
FIG. 1 is a block diagram of the document structure analysis system of the present invention in accordance with the preferred embodiment, which is shown receiving the output of an optical character recognition (OCR) system.

Document recognition can be viewed as a task having several phases, which will be discussed with reference to the document structure analysis system 1 shown in FIG. 1. In the first phase, the document is scanned using an optical scanning device 2. Many optical scanning devices are known in the art that are suitable for this purpose. Generally, a typical optical scanning device projects light onto the document being scanned and the light reflected from the document is converted into electrical digital signals. In the second phase, the document is segmented and the characters and character fonts are recognized by an optical character recognition (OCR) system 4. The OCR system 4 comprises a computer 5, such as one or more microprocessors, and a memory device 6, typically a solid state memory device (not shown). The computer 5, which is represented in FIG. 1 as a host central processing unit (CPU), analyzes the digital signals in accordance with a character recognition software routine to perform document segmentation and character/font recognition. The results of the analysis are stored in the memory device 6.

The recognized characters are formatted using a formatting routine executed by the computer 5 and stored in a file in a memory device 6 in the format generated by the formatting routine. During a third phase, this file is further analyzed in accordance with a document structure analysis routine of the present invention to identify the "structured" components (i.e., geometrical and logical components) of the document. The present invention is directed to this third phase of the document recognition procedure. Therefore, the discussion of the present invention will be limited to a discussion of this third phase and the method and apparatus of the present invention utilized to perform the tasks associated with this phase. Hardware and/or software utilized to perform the tasks associated with the first and second phases are known in the art. Those skilled in the art will understand how suitable hardware and/or software may be selected for performing these tasks. It should also be noted that although separate hardware/software are illustrated as being utilized to perform the tasks associated with the third phase, this is not required. The computer 5 and memory device 6 that are utilized by the OCR system to perform the tasks associated with the second phase may be utilized to perform the tasks associated with the third phase in accordance with the present invention.

Figure 2:
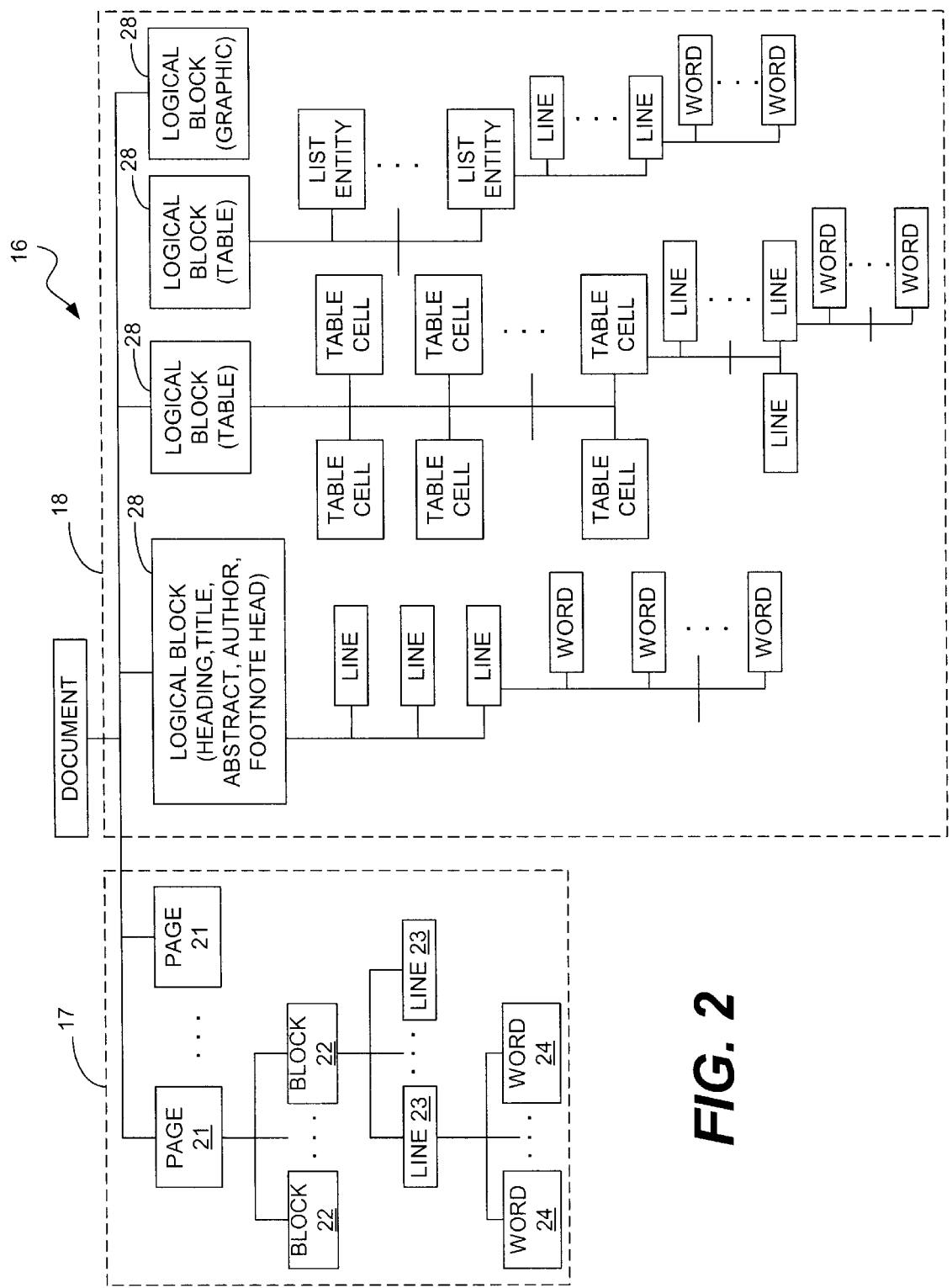
FIG. 2 is a diagram illustrating a document model comprised of two main portions, namely, a physical portion (the left side of the model) and a logical portion (the right side of the model).

The tasks performed during the third phase will be referred to herein as document structure analysis. In accordance with the preferred embodiment, the document structure analysis system 1 of the present invention is separate from and receives the output of the OCR system 4, as illustrated in FIG. 1. The system 1 comprises a computer 12 and a memory device 13. The computer 12 may be configured to execute a document structure analysis routine 20. When the computer executes the document structure analysis routine 20 of the present invention, the computer 12 performs document structure analysis and stores the results in memory device 13 or outputs the results in a form that is usable by a person. In other words, the results may be displayed on a display device (not shown) printed on a printer (not shown), etc. In order to describe the document structure analysis method of the present invention, a document model will be used, which is shown in FIG. 2.

The document model 16 is comprised of two main portions, namely, a geometrical, or physical portion 17 (the left side of the model) and the logical portion 18 (the right side of the model). From the physical point of view, the document comprises three types of objects, namely, pages 21, blocks 22, lines 23 and words 24. Each page comprises one or more blocks. Each block comprises one or more lines and each line comprises one or more words. From the logical point of view, the document contains logical blocks 28, which can contain one or more of several logical units, such as, for example, a heading, a title, tables, lists, etc. A logical unit has several characteristic appearances. For example, a logical unit can be a title, a heading, an abstract, an author, a footnote, a headline, etc. In these cases, the logical unit corresponds to exactly one block. These logical units can be assigned various labels, with each label carrying a probability value (e.g., 80% heading, 12% title, 8% author). Logical units may also be aggregations of blocks of either one list or one table. Either of these two types of logical blocks will have exactly one label, i.e., 100% list or 100% table. A list is comprised of a one-dimensional sequence of blocks, which themselves are labeled as list items, or sub-lists. Tables are even more complex in that they generally are two-dimensional, array-like structures. Furthermore, tables may have some structural irregularities, as will be discussed below in more detail.

Figure 3:
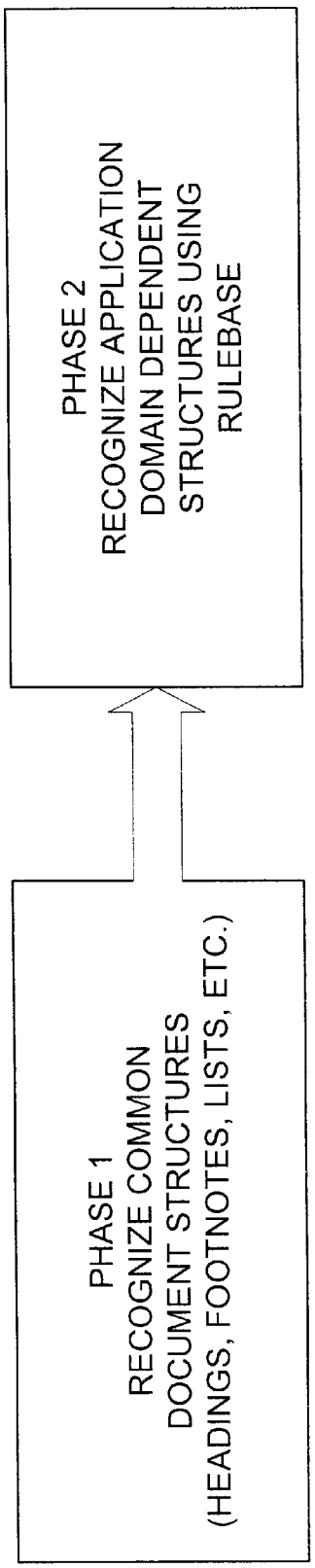
FIG. 3 is a diagram illustrating the first and second phases of the document structure analysis process of the present invention.

In accordance with the present invention, recognition of the document structure is divided into two different phases of processing, as shown in FIG. 3. In the first phase, common document structures, such as headings, footnotes and lists, for example, are recognized. In the second phase, all domain-dependent logical elements are recognized using the rule base of the present invention. In the first phase, common structures are recognized independently. The system 1 determines a document head by evaluating pixel values corresponding to the top of the document and attempting to locate a line that is not "too far away" from the top (i.e., by locating a small top margin). If a line is found in this region, it is marked as belonging to the head of the document. The system 1 then sequentially assigns all lines downward to the head of the document until a point is reached at which the document head has become, or is about to become "too big". When the document head has become larger with respect to the vertical dimension of the page (e.g., a quarter) than it should be, the system 1 negates the assumption that the next line should be allocated as belonging to the document head. The recognition of the document foot is performed in a similar manner by locating lines within a certain distance from the bottom of the page and by marking them as belonging to the foot of the document.

The system 1 locates a title in a document, such as a technical document or a journal, generally by assuming words in the title will be capitalized, in a bold font style, and/or will be in a larger-than-"normal" font size, or some combination of these features. Author determination generally is performed by determining whether a word follows the word "and" or "by", whether an initial (as in a name) is present, and/or whether the word is in the dictionary or not, because frequently surnames are not in the dictionary, or any combination of these features. Abstract recognition generally is performed by analyzing the document for a section having a section title that matches the word "Abstract" case insensitively. Detecting a new section generally is performed by determining whether the first word of the subsequent lines of the documen have an unusual font style and/or size associated with them. Also, a test is made to determine whether the word has left and right indentation, thus indicating centering, which is a common characteristic of section titles. This indicates a section break between two paragraphs.

After determining that a section break exists between two paragraphs, section title determination is performed by looking at the beginning of the second paragraph (i.e., the first paragraph after the section break) and attempting to extract the section title, if it exists. This is accomplished by attempting to locate a contiguous sequence of words set in a larger-than-normal font size or in bold font style, starting at the beginning of the paragraph. If such a sequence is located, the system 1 marks that sequence as the section title. In order for a paragraph to be detected, the system 1 analyzes each line and determines if a line is shorter than the ones before. While necessary for a paragraph break, this condition may not be sufficient. Therefore, the system 1 next looks for extra vertical white space between the next two lines, and if it finds any, it determines that a paragraph break has been detected. Otherwise, it checks to see if the first word of the second line is indented off the left margin. If so, the system 1 assumes that it has detected a new paragraph. The system also determines whether the end of the first sentence is indented off the right margin, which is an additional indicator of a paragraph break. If all of these tests fail, the system 1 determines that a paragraph break has not been identified.

In order to identify lists, the system 1 scans throw each line of the current zone and searches for the beginning of a list entity, i.e., the "entity beginning" criteria. If such is found, it parses through the line located directly under that line and determines whether the line holds the "entity continue" criteria. If so, the line is added to the list entity (i.e., marked as being associated with the list entity). If not, the line could either be the beginning of a new entity or the end of the list. The pseudocode for performing this task follows.

```
For each line l_i of the zone do
    if l_i is an entity beginning
    then uline = line under l_i
        if uline is an entity continuing
        then add uline to the entity
        else if uline is a list ending
            then break.
```

The "entity beginning" criteria is as follows:
1. The first word is a relatively short word.
2. If other entities already exist for the list, the line must be left aligned with them.
3. If other entities already exist for the list, the line must have the same line distance to the upper line.
4. If the list items are enumerated, the enumeration must be in correct order. For example, the first entity must be enumerated as '1', or 'A', etc., the second entity must be enumerated as '2', or 'B', and so on.

Alternatively, all entities must be enumerated with the same bullet, or hyphen, etc.

The "entity continuing" criteria is as follows:
1. The line must be left aligned with the first or second word of the upper line.
2. If other entities already exist, the line must have the same line distance to the upper line.
3. The line must have as the same font as the upper line.

Figure 4:
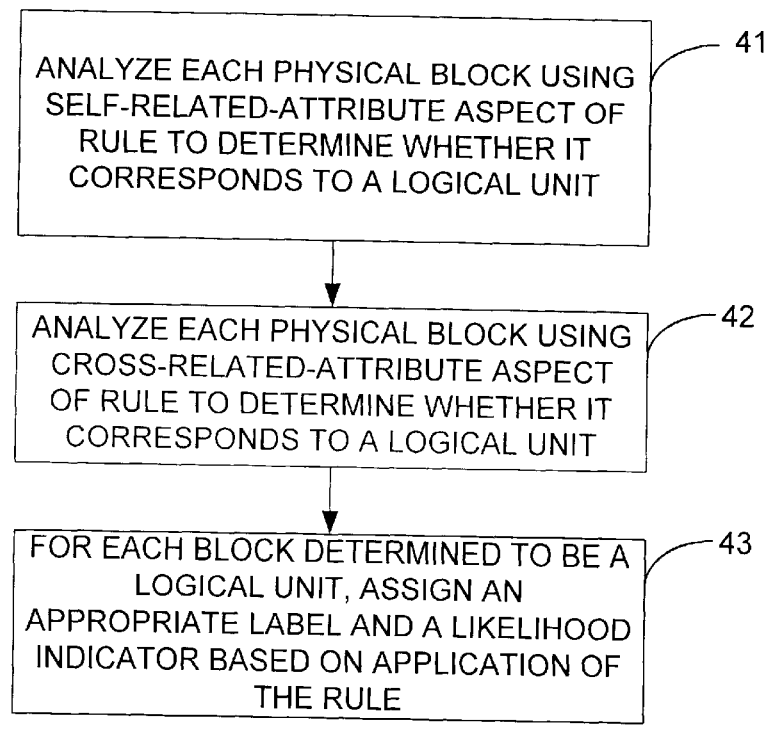
FIG. 4 is a flow chart illustrating the second phase of the document structure analysis process shown in FIG. 3.

The "list ending" criteria is as follows:
1. The line must not be an entity beginning nor an entity continuing
2. The line must have a line distance larger than the line distances between the other entities:

The second phase of the document structure recognition process, which is represented by the flow chart of FIG. 4, is a rule-based analysis. This phase is more complex than the first phase due to the variety of possible scenarios and different dispositions of elements within a page. Therefore, the rule base preferably does not utilize predefined labels or restrict the labels in any way. Furthermore, the rule base preferably is exchangeable and editable during runtime of the system 1 to ensure that the rule base is adaptable to the document domain, e.g., business letters, technical journals, etc. For each domain, an appropriate rule base preferably is created and tuned to the domain, either offline or during runtime.

In order to perform logical labeling, each physical block within the document is regarded as isolated and each block is tested against the rule base independently. Each physical block is then tested to determine the likelihood that it corresponds to a particular logical element. These steps are represented by blocks 41 and 42 of the flow chart shown in FIG. 4. Each block is assigned the appropriate logical label and an indicator indicating the likelihood that the label is correct. These steps are represented by block 43 of the flow chart shown in FIG. 4. This process enables any physical block to be assigned more than one label, e.g., 80% heading, 20% title, etc. For each type of label, exactly one rule is defined for detecting blocks that correspond to the label. Preferably, the rules are only used to locate domain-dependent objects, i.e., structures that are unique to a particular application domain. The tasks of locating and recognizing common document structures (i.e., structures that are common to all application domains), such as headings, lists, etc., are performed during the first phase, preferably by utilizing hard-coded algorithms.

A rule may be a simple "if-then" rule or may be specified by a logical expression, or by a combination of logical expressions, by using logical operations 'and', 'or', 'not' and parentheses. For example, a logical expression such as (A AND B) OR (C NOT D), where A, B, C and D are operands. A rule is tested by evaluating the logical expression. In accordance with the preferred embodiment, the logical OR operation is calculated by using a maximum function and the logical AND operation is calculated by using a mean function. The logical NOT operation preferably is calculated by the subtraction from 1. For example, the logical expression NOT D is calculated by the expression (1−D).

The result of evaluating a rule against a block preferably is a normalized value between 0.0 and 1.0. This value represents how closely the rule matches the block on a percentage basis. Each rule preferably has two components, namely, a self-related attribute component and a cross-related attribute component. The application of these two attributes of the rule is represented by blocks 42 and 43, respectively, of the flow chart of FIG. 4. The self-related attribute component relates only to features of the block under consideration (i.e., the current block being labeled). These are about morphological features of the physical block, such as dimensions, position in the page, number, style of lines, character font, etc. Fonts are defined by characteristics such as font family, size, boldness, etc. With these self-related attributes, rules can be defined that depend on the location of a block on a page or the number of lines in the block, such as, for example, a rule that requires that an address be in a certain position on the page, have more than two lines and contain a zip-code.

Cross-related attributes define features of blocks in relation to other blocks, such as the position of the block in the page in relation to one or more other blocks. With these relationships, it is possible to express rules such as, for example, "A subject must be positioned beneath an address", or "a date must be positioned to the right of the recipient's name". Also, the relative number of common words in a block may be defined by rules such as, for example, "A closure block must have at least one word in common with the sender's name".

Figure 5:
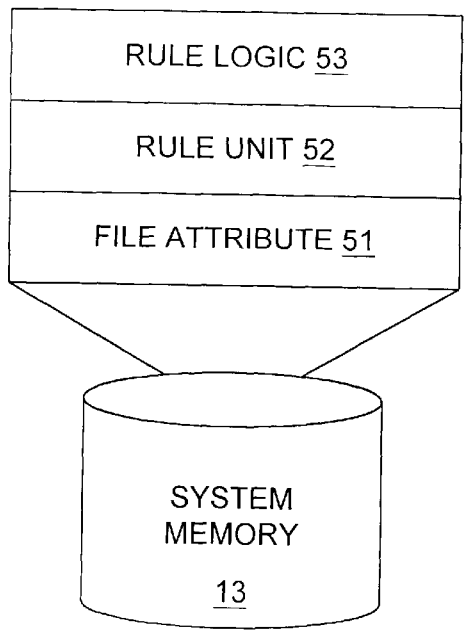
FIG. 5 is a block diagram of the different parts of each rule of the rule base of the present invention utilized during the second phase of the process shown in FIG. 4.

As shown in FIG. 5, the rule base of the present invention preferably is divided into several parts, namely, a file attribute 51, a rule unit 52 and a rule logic 53, which preferably occur in this sequential order. The file attributes may comprise, for example, only the version number, which is used to indicate the syntax of the file and to identify the appropriate parser to be used in evaluating a block.

The syntax of the file attributes is like this:

```
{
    Version:        <actual version number>
}
```

The rule unit defines the self-related and cross-related attributes associated with the rule. The syntax of the rule unit may be, for example:

```
SelfAttribs:
{
Region:     <coordinates of the region>
Font:       <family, size, bold, italic, underlined, superscript,
             subscript:>
Words:      <list of words which must be in the block to fire the rule>
RegExp:     <regular expression which must be in the block---"--->
OrLimit:    [0.0 ... 1.0] <if the assessment of this rule unit is greater
than this value, all other disjuncted units are truncated and
not evaluated. Set to 1.0 to disable this feature.>
AndLimit:   [0.0 ... 1.0] <if the assessment of this rule unit is less than
this value, all other conjuncted units truncated and not
evaluated. Set to 0.0 to disable this feature.>
CrossAttribs:
{
Label:      <label of another block>
Region:     <coordinates of another block>
```

-continued

```
Allen:           <Allen's geometrical relations>
Common Words:    <list of words which both blocks must have in
                  common>
AbsNrComWords:   <absolute number of common words>
RelNrComWords:   [0.0 ... 1.0] <relative number of common words>
    ...
}
...
{
}
EndCrossAttribs
}
```

The coordinates of a region may be defined in terms of the left, top, width, and height intervals of the region in pixels. For example, a region could be defined in absolute terms as having, respectively, left, top, width, and height pixel dimensions of: pix [0 ... 5][2 ... 10][250 ... 300][50 ... 100]. Alternatively, a region could be defined in terms of pixels relative to the width and height dimensions of the document as having, respectively, left, top, width, and height intervals of: doc [0.01 ... 0.1][0.05 ... 0.13][0.2 ... 0.25][0.1 ... 0.2]. Alternatively, a region could be defined in terms of pixels relative to the font size associated with the region as having, respectively, left, top, width, and height intervals of: font [0 ... 0][0 ... 0][10 ... 20][1 ... 1.5].

If an interval is [0 ... 0], for example, then the value is not defined and will not be considered. For example, the region dimensions in terms of font defined as font [0 ... 0][0 ... 0][10 ... 20][1 ... 1.5] describes a region that is from 10 to wide and from 1 to 1.5 font sizes high.

Allen's geometrical relations, which are used in the rule unit to describe cross-related attributes, as shown in the example rule unit above, are a list of geometrical relations which all must be true. These relations are generally known in the art and therefore will not be described herein.

The rule logic is used to define the combined features of a block. It's syntax is:

```
{
Label:        <label (which will be given to the block)>
Comment:      <user comment describing the logical rule>
Expression:   <logical expression>
MatchLimit:   <if the match is better, the rule will fire>
}
A logical expression (exp) has the following syntax:
exp:          [-] ExpLetter / exp op exp / [-] (exp op exp)
op:           */+
```

The priority could be changed by using parenthesis. Negative rule units could be expressed by using a 'minus' in front of the expression. The following examples demonstrate negative rule units:

$$A*-(B+-C)$$

$$-A*B*-C$$

Also, rules could be weighted within the logic. For example, weighted logic could take on the form:

$$w_1 * \text{ExpLetter}_1 * (w_2 * \text{ExpLetter}_2 + w_3 * \text{ExpLetter}_3)$$

where the letters $w_1$, $w_2$ and $w_3$ correspond to weighting factors.

The semantics and properties of the rule base preferably are as follows:

1. A rule is defined with exactly one rule logic and at least one rule unit.
2. A rule unit can only be used by exactly one (it's) rule logic.
3. The rule logic and it's units have the same 'Label' token.
4. There cannot be two rule logics with the same 'Label' token.

The following is an example of one application of the preferred rule base:

```
//          file attributes
{
Version:        1.3
}
// rule units
{
Label: Address
Comment:    "This is only an example of a rule unit"
ExpLetter:  A
{
Region:     pix (0 5 1 (2 10](250    300 1 (50    100]
Font:: Arial 12 no no no no no
AssessLimit:    0.6
}
Label: Address
Comment:    "This is another example of a rule unit"
ExpLetter:  B
{
Region:     font(0      01(0 0 1 (15      20 1 (1      2]
Font.: Serif 10 yes no no no no
AssessLimit:    0.6
}
{
Label:      Header
CommonWords:        Subject
}
}
// rule logics
{
Label: Address
Comment:    "If A AND B is true, the block is an address"
Expression:     A * B
MatchLimit: 0.75
}
```

Of course, the present invention is not limited to this particular configuration of the rule base. This configuration is meant only to be an example of the manner in which the rule base could be implemented. Similarly, the parts of the the rule base are not limited to the configurations described above, as will be understood by those skilled in the art. Those skilled in the art will also understand that the present invention is not limited with respect to the manner in which the tasks of the aforementioned first phase of the method of the present invention are performed. Those tasks were described with respect to exemplary, and in some cases, preferred, embodiments for performing those tasks. It will be understood by those skilled in the art that these features of the present invention can be modified and that such modifications are within the scope of the present invention.

What is claimed is:

1. An apparatus for performing document analysis comprising:

first logic configured to recognize and label structures in a document that are common to multiple types of documents; and second logic configured to recognize structures in the document that are unique to a particular type of document, wherein the document being analyzed is of said particular type;

wherein the second logic utilizes a rule base to analyze structures in the document in order to recognize structures that are unique to said particular type of document, the rule base comprising a plurality of rules for testing structures in a document;

wherein each rule of the rule base includes a file attribute portion, a rule unit portion and a rule logic portion.

2. The apparatus of claim 1, wherein the rule unit portion associated with a particular rule defines self-related attributes and cross-related attributes associated with the particular rule, the self-related attributes corresponding to particular features of structures of a document being analyzed, the cross-related attributes corresponding to relationships between particular features of structures of said particular type of document.

3. The apparatus of claim 2, wherein the rule logic associated with a particular rule comprises a particular logical expression associated with the particular rule.

4. The apparatus of claim 3, wherein each rule is defined by only one rule logic and by at least one rule unit.

5. The apparatus of claim 4, wherein each rule unit is associated with no more than one rule logic.

6. An apparatus for performing document analysis comprising:

first logic configured to recognize and label structures in a document that are common to multiple types of documents; and second logic configured to recognize structures in the document that are unique to a particular type of document, wherein the document being analyzed is of said particular type;

wherein each document to be analyzed is comprised of at least one physical block and wherein the second logic analyzes the physical block and assigns a label and a likelihood indicator to the physical block, the label indicating that the physical block corresponds to a particular type of physical block and the likelihood indicator indicating a probability that the label that has been assigned to the physical block is correct;

wherein the second logic utilizes a rule base to analyze said at least one physical block, the rule base comprising a plurality of rules for testing said at least one physical block to determine the label and likelihood indicator that are to be assigned to the physical block.

7. The apparatus of claim 6, wherein each rule of the rule base includes a file attribute portion, a rule unit portion and a rule logic portion.

8. The apparatus of claim 7, wherein the rule unit portion associated with a particular rule defines self-related attributes and cross-related attributes associated with the particular rule, the self-related attributes corresponding to particular features of a physical block, the cross-related attributes corresponding to relationships between at least two physical blocks.

9. The apparatus of claim 8, wherein the rule logic associated with a particular rule comprises a particular logical expression to be used in testing a physical block in accordance with the particular rule.

10. The apparatus of claim 9, wherein each rule is defined by only one rule logic and by at least one rule unit.

11. The apparatus of claim 10, wherein each rule unit is associated with no more than one rule logic.

\* \* \* \* \*